UNITED STATES PATENT OFFICE.

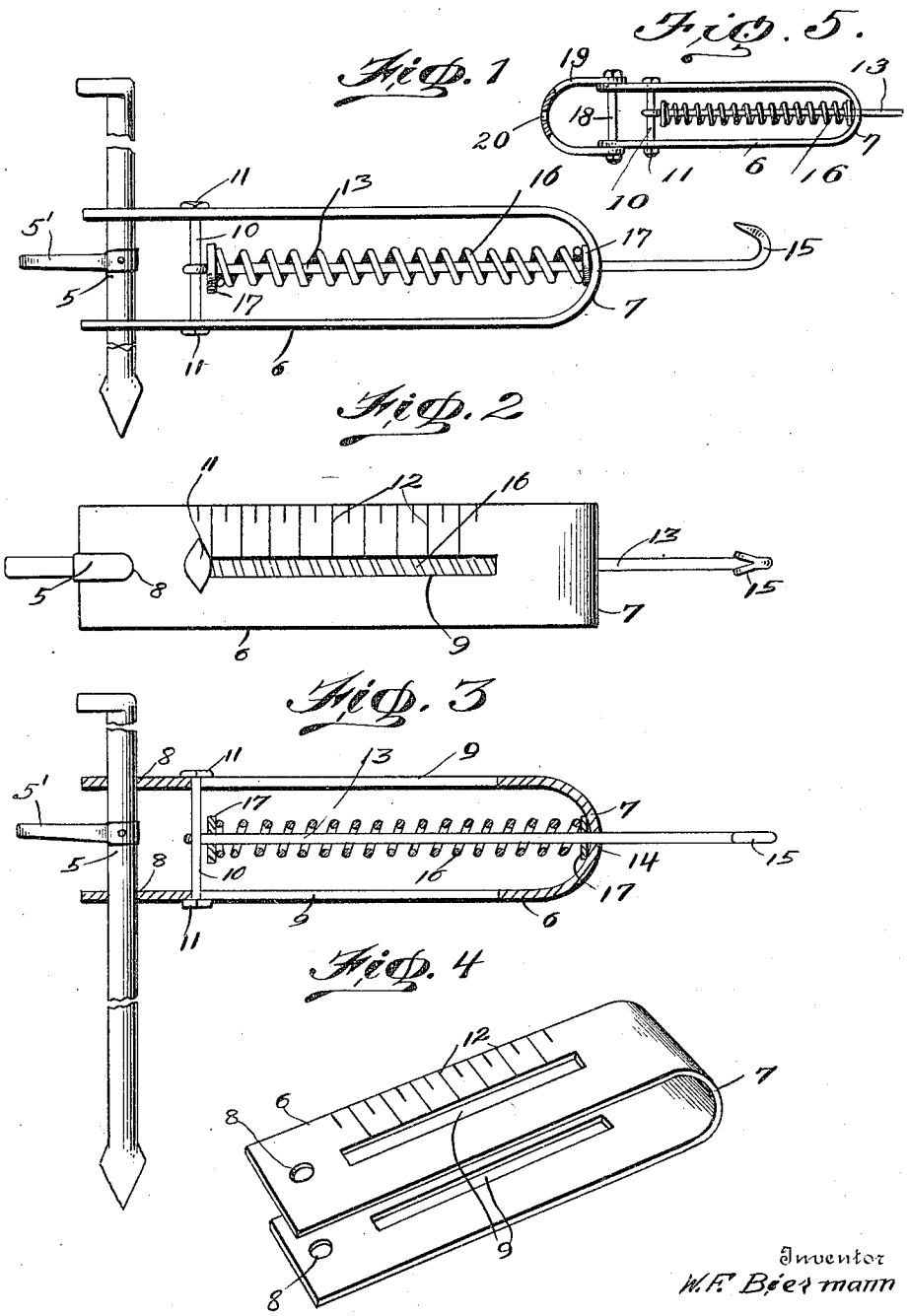

WILLIAM F. BIERMANN, OF WISNER, NEBRASKA.

CHECK-ROW ANCHOR.

1,306,045.   Specification of Letters Patent.   Patented June 10, 1919.

Application filed January 25, 1919. Serial No. 273,193.

*To all whom it may concern:*

Be it known that I, WILLIAM F. BIERMANN, a citizen of the United States, residing at Wisner, in the county of Cuming, State of Nebraska, have invented certain new and useful Improvements in Check-Row Anchors; and I do hereby declare the following to be a full, clear, and exact description of the invention, such as will enable others skilled in the art to which it appertains to make and use the same.

This invention is an improvement in check row anchors and has particular reference to a wire tension measuring device therefor.

An object of the invention is to provide an improved device whereby row wires may be connected to the anchors and placed under a certain predetermined tension so as to aid in procuring uniformity in planting corn and the like.

Another object is to provide a device of this character which is simple in construction, easy to manufacture and effective in carrying out the purpose for which it is designed.

The inventive idea involved is capable of receiving a variety of mechanical expressions one of which, for the purpose of illustrating the invention, is shown in the accompanying drawing wherein:—

Figure 1 is a side elevation of the device constructed in accordance with the invention.

Fig. 2 is a top plan view.

Fig. 3 is a longitudinal section.

Fig. 4 is a perspective view of the body portion of the measuring device, and

Fig. 5 is a sectional elevation, showing the use of the device as a wire stretcher.

Referring more particularly to the accompanying drawing the numeral 5 indicates the usual stake employed to anchor the end of a check row wire and in practising the present invention there is employed a measuring device to which the check row wire is attached so that when the same is drawn taut the tension thereon may be measured and in this manner a number of the wires may be placed under a uniform and predetermined tension.

The measuring device preferably comprises a body portion 6 formed of an elongated plate or strip of material bent upon itself intermediate its ends to provide the bight portion 7 and said ends of the plate are provided with vertically alined openings 8 for receiving the stake 5 whereby the body portion is attached thereto. The upper and lower sides of the body portions 6 are provided with elongated and vertically alined guide slots 9 in which is slidably mounted the indicating cross arm 10 disposed in parallel relation with the stake 5 and having the retaining means or pointers 11 upon each end thereof which engage the outer surfaces of the sides of the body portion and prevent detachment of the arm or indicator from the device. The upper pointer 11 moves over a scale 12 formed upon the outer or upper surface of the upper side of the body portion and said scale is preferably graduated to indicate the number of pounds tension or pull which is placed upon the wire attached to the device.

At a point intermediate the upper and lower ends of the indicator 10, the same has connection to one end of a rod 13 which extends longitudinally between the upper and lower sides of the body portion and through an opening 14 formed in the bight portion 7 of the body so as to slide therein. The outer end of the rod 13 is provided with a hook 15 to which a check row wire is attached when the same is being stretched or placed under tension. This stretching operation is performed against the tension of a spring 16 coiled about the rod 13 and interposed between washers 17 mounted upon said rod between the bight portion and the indicator 10. It will thus be apparent from the foregoing description that when a check row wire connected to the hook 15 is pulled to be placed under tension the spring 16 will be contracted and the indicator 10 moved toward the bight portion 7 to register the number of pounds pull upon the wire and immediately upon the release of the tension on said wire the indicator 10 will return to its normal position adjacent the free ends of the body portion by reason of the expansion of the spring 16.

In Fig. 5 of the drawings, I have shown an adaptation of the device as a wire stretcher, in which the construction is the same, except that in lieu of the anchoring stake as used in connection with check row anchors, a bolt 18 is employed in order to attach or pivotally connect a U-shaped member or clevis 19 to the body portion of the device. The bolt 18 is disposed through the openings 8 and suitably fastened, with the leg portions of the clevis 19 apertured to engage therewith, and an aperture provided in the bight portion as shown at 20, in order to attach the device to a wire stretcher. In this instance, the present device will permit the stretching of all of the wires to the same degree tension, thereby preventing the fence from being crooked, on account of some wires being loose, or requiring that the wires be tightened.

For facility in setting the stake into hard soil, a foot step 5' is provided, the same being detachable, so as to permit the stake to be engaged in the apertures 8 or removed therefrom, with the foot step removed. The fastening is made in any suitable manner, as by bolting, riveting or the like. In Fig. 5, the parts being the same, except the parts substituted for the stake, they are designated by the same reference characters. It will also be understood that in each instance, the device serves the function of a wire tension measuring device or register, the tensional pull being indicated to secure uniformity.

In the particular application of the device as a wire tension measuring device for check row anchors, and forming a part of the anchor itself, the check row wire will be placed under the same tension each time, by noting the tensional pull on the scale. This will obviate the necessity of putting sticks in the holes where the stakes are placed in order to keep the wire under the same tension, and besides the trouble caused thereby, accuracy will be secured on a field even though it is not square. Even tension means straight corn rows cross ways, and straight corn rows means more corn per acre, the importance to corn raisers, as well as to the size of the crop and aggregate corn production, it is thought will be fully understood. By way of explanation, it may also be stated that when the device is in use as a wire stretcher, the wire grip of any preferred or well known construction, is connected to the rod 13, thus insuring that all of the wires will be stretched to the same degree of tension, with a consequent improvement in the fence construction.

What is claimed is:—

In a device of the class described a body portion formed from an elongated plate bent upon itself with a resultant intermediate bight portion, the ends of said plate having alined openings for receiving a stake, the sides of the body portion having elongated and alined guide slots, an indicator movable in said slots, a rod connected to said indicator and extending through the bight portion and having a hook at one end, and a coil spring interposed between said bight portion and indicator.

In testimony whereof, I affix my signature, in the presence of two witnesses.

WILLIAM F. BIERMANN.

Witnesses:
H. A. TIEDTKE,
MARY M. EMLEY.

Copies of this patent may be obtained for five cents each, by addressing the "Commissioner of Patents, Washington, D. C."